United States Patent

Hwang et al.

[11] Patent Number: 5,368,804
[45] Date of Patent: Nov. 29, 1994

[54] METHOD OF MOLDING COMPOSITE BICYCLE FRAMES

[75] Inventors: Jen-Loong Hwang, Hsinchu; Sheng-Long Wu, Hua-Lien; Yu-Hsuan Chen, Kaohsiung; Chin-I Lin, Tainan, all of Taiwan, Prov. of China

[73] Assignee: Industrial Technology Research Institute, Hsinchu, Taiwan, Prov. of China

[21] Appl. No.: 91,879

[22] Filed: Jul. 14, 1993

[51] Int. Cl.⁵ ............... B29C 43/36; B29C 67/14
[52] U.S. Cl. ........................... 264/258; 156/156; 156/245; 264/313; 264/314; 280/281.1; 425/DIG. 44
[58] Field of Search ........... 264/257, 258, 313, 314; 280/281.1; 425/DIG. 44; 156/156, 245

[56] References Cited

U.S. PATENT DOCUMENTS

| | | | |
|---|---|---|---|
| 4,828,781 | 5/1989 | Duplessis et al. | 264/314 |
| 4,850,607 | 7/1989 | Trimble | 280/281.1 |
| 4,889,355 | 12/1989 | Trimble | 264/314 |
| 4,902,458 | 2/1990 | Trimble | 264/258 |
| 4,941,674 | 7/1990 | Trimble | 264/258 |
| 4,982,975 | 1/1991 | Trimble | 264/258 |
| 4,986,949 | 1/1991 | Trimble | 264/314 |
| 5,116,071 | 5/1992 | Calfee | 264/258 |
| 5,122,210 | 6/1992 | Kobomura et al. | 156/245 |
| 5,271,784 | 12/1993 | Chen et al. | 264/314 |

*Primary Examiner*—Jay H. Woo
*Assistant Examiner*—Robert B. Davis
*Attorney, Agent, or Firm*—Darby & Darby

[57] ABSTRACT

A method of molding a composite bicycle frame that includes the steps of curing a pair of seat stays and chain stays respectively and then connecting with the front triangle. Non-foaming dilatable materials are provided at suitable locations in the mold, such as the steering support cavity, the pedal support cavity, the seat stay butting cavity and the chain stay butting cavity. By heating the mold once, the seat stays and chain stays will secure with the front triangle and the front triangle can be cured at the same time to simplify the mold and the process.

16 Claims, 7 Drawing Sheets

METHOD OF MOLDING COMPOSITE BICYCLE FRAMES

BACKGROUND OF THE INVENTION

This invention relates generally to a method for manufacturing bicycle frames, in particular, to a method for molding bicycle frames by using composite materials and molds suitable for implementing the method.

The performance characteristics of composite bicycle frames which conventional bicycle frames cannot achieve are light weight, high specific strength (strength/specific gravity), high specific rigidity (rigidity/specific gravity), suitable for versatile design, good ability for absorbing shock, etc. Therefore the manufacturing of composite bicycle frames has become one of the aims in the development of bicycles in the world.

The composite bicycle frames can be divided into two kinds: the lug type and integrally formed type. Bicycle frames of the lug type are made from individual composite tubes which are joined together by adhering metallic joints therebetween. Although they have the advantages of easy mass production and low cost, they still have the disadvantages of limited configuration and low reliability of adhesive strength, that is, the stress transferred between joints and composite tubes is only achieved by adhesive therebetween so that the strength is relatively weak. Hence, a monocoque type frame has been developed to overcome the preceding drawbacks, that is, the whole frame is made from composite materials with metallic parts embedded in suitable positions, if necessary.

Conventionally, a bicycle frame, as shown in FIG. 1, comprises steering support means 10, seat support means 20, pedal support means 30, a pair of rear wheel dropouts 40, a top tube 50, a down tube 60, a seat tube 70, a pair of seat stays 80 and a pair of chain stays 90. The top tube 50, down tube 60, and seat tube 70 form an open "front triangle", and the seat tube 70, seat stays 80 and chain stays 90 form a pair of open "rear triangles", with the seat tube 70 being the common side of the front and rear triangles. It is to be noted that the bicycle frames can have many variations in configuration, for example, some omit the seat tube, and some do not have a definite top tube. Generally, the triangle formed by the steering support means 10, seat support means 20 and pedal support means 30 is still called a "front triangle", and the seat stays 80 and chain stays 90 can be transformed to form a pair of continuous "rear triangles". The bicycle frame described in the specification is directed to a combination of the front triangle and rear triangles.

In molding the composite bicycle frames, plies of prepreg (glass fibers, carbon fibers or KEVLAR® fibers) can be laid up depending upon the required shape in each of the mold pieces and be heated and cured to form the desired bicycle frame.

Regarding the methods for integrally forming the composite bicycle frames, they are disclosed in U.S. Pat. Nos. 4,850,607, 4,889,355 and 4,902,458 (all by the same inventor). These prior patents disclosed the method of making composite bicycle frames by using three mold pieces (referring to FIG. 2, the reference numerals 97, 98 and 99 identify the three mold pieces, respectively.) In molding the frame by the three mold pieces, pieces of resin impregnated fabric are laid up and air bladders are placed therein. The uncured frame is thereafter placed in the three mold pieces to be inflated, heated and cured. When inflating, the pressure generated by the inflated bladders may be insufficient to press some places which are near the steering support means, seat support means and pedal support means of the bicycle frame. Therefore foamable resins which expand on heating are used to provide sufficient pressure for forming these portions.

However, these frames in the prior patents have the following drawbacks:

(a) The method of molding the frame structure employs a female molding unit having three mold pieces. It is difficult to control the molding accuracy and the manufacture of the molding unit is expensive because of its large size.

(b) It is difficult to transfer heat from the molding unit to the frame such that the molding process is slow and the frame has a longer molding cycle resulting in reduced production because the molding unit is large in size.

(c) It is inconvenient to place the laid up impregnated materials in the molding cavities and to assemble the separate mold pieces together because of the large-sized mold pieces. The impregnated materials are easily pinched by the mold pieces.

(d) The frame which is formed by using the foamable resins will increase its weight.

(e) The bubbles in the foamable resins which remain in the bicycle frame will expand to a rather large extent due to the heating and cause stress concentrations between the frame.

(f) It is difficult to control the foamable resins and they will flow out of the clearances between the impregnated materials and sleeves embedded in the frame.

SUMMARY OF THE INVENTION

It is therefore an object of this invention to provide a method of molding composite bicycle frames without the above drawbacks.

A further object of this invention is to provide a method of molding composite bicycle frames so that the heat transfers from the molding unit to the frame quickly. In this manner, the molding process is shortened and the frame has a shorter molding cycle for easy mass production.

A further object of this invention is to provide a method of molding composite bicycle frames which has a better effect in quality control of microstructure and prevents the prepreg from pinching by the mold pieces.

Another object of this invention is to provide a method of molding composite bicycle frames which is easy to control the molding precision and the manufacture of the bicycle frame is at low cost.

Still a further object of this invention is to provide a method of molding composite bicycle frames, wherein the frame is relatively light and stress concentrations can be avoided because the frame has no foamable resins or other adverse objects.

Yet another object of this invention is to provide a method of molding composite bicycle frames which has a better effect in control without the disadvantage of using the foamable resins such as the foamable resins' flowing out of the clearances between the prepreg layers and sleeves embedded in the frame.

In order to achieve the above objects, the present invention provides a method of molding composite bicycle frames which adapts respective molds for forming the front triangle and rear triangles. The seat stays and chain stays are first cured by conventional methods. The front triangle of prepreg lay-up and bladders are placed in the front triangle mold, wherein the front triangle mold is provided with non-foaming dilatable materials at suitable locations which have greater expansion coefficient than that of the mold to substitute for the conventional foamable materials. The cured seat stays and chain stays are connected with the front triangle of prepreg lay-up in the mold. The front triangle is inflated, heated and cured such that the manufacturing of the whole bicycle frame is completed.

These and other objects, advantages and features of the present invention will be more fully understood and appreciated by reference to the written specification and appended drawings.

BRIEF DESCRIPTION OF THE DRAWINGS

FIG. 4A is a sectional view taken substantially along the line A—A of FIG. 4 of the drawings;

DETAILED DESCRIPTION OF THE INVENTION

Figure 1:
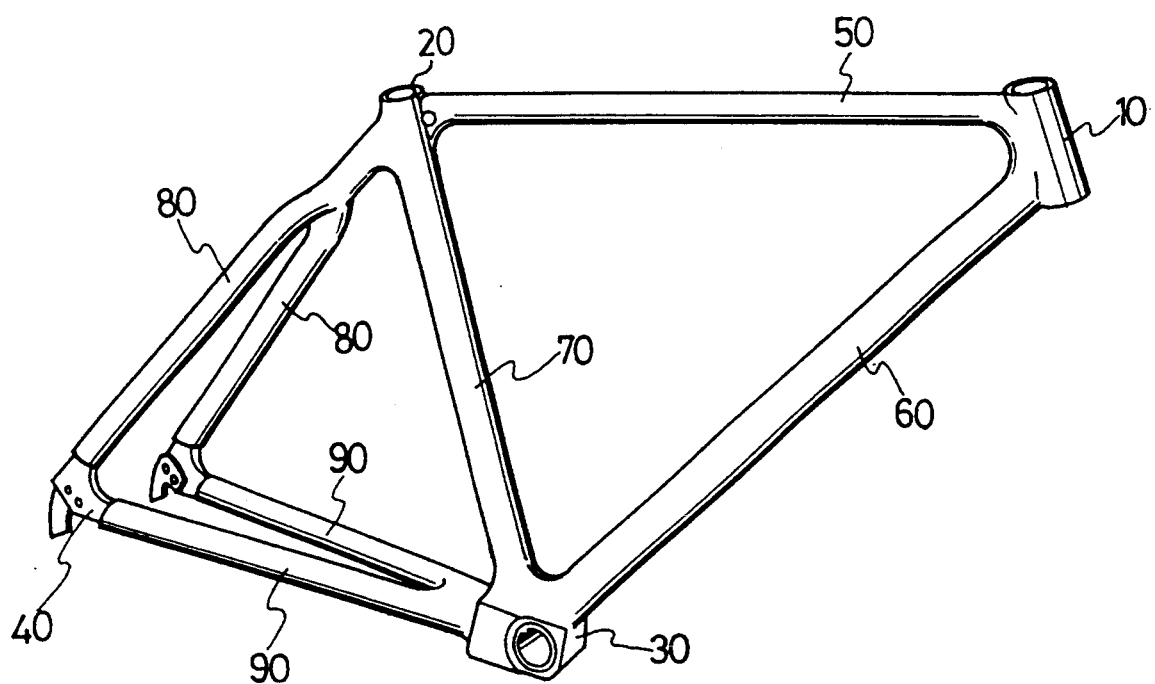
FIG. 1 is a perspective view illustrating a general bicycle frame.
Figure 2:
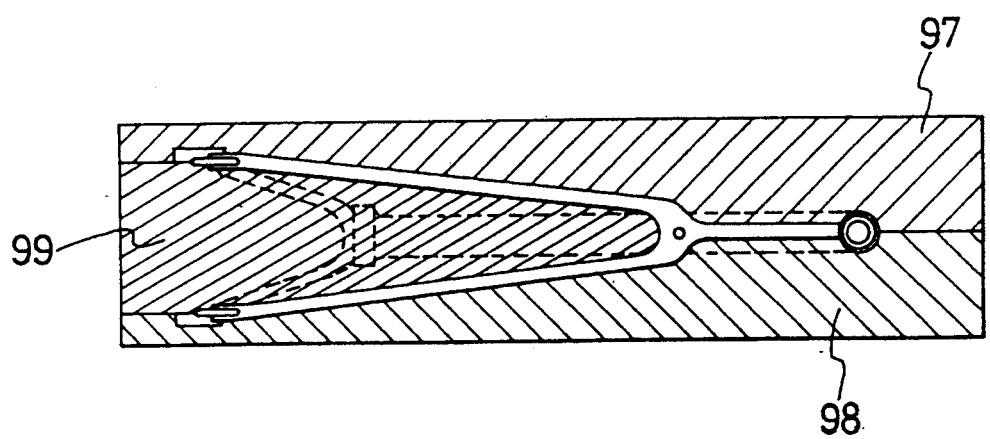
FIG. 2 is a sectional view illustrating the three mold pieces disclosed in the prior art for forming the composite bicycle frames.
Figure 3:
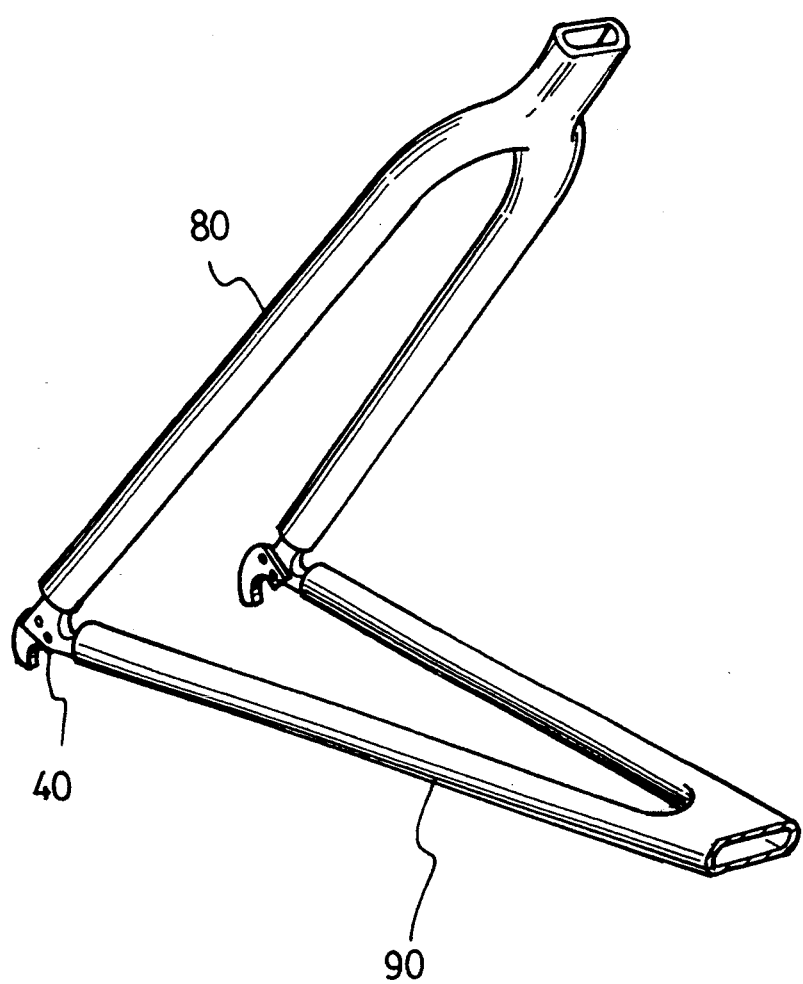
FIG. 3 is a perspective view illustrating the combination of seat stays and chain stays in accordance with the present invention.

It should be noted that the seat stays 80 and chain stays 90 are first cured in the respective mold (not shown). As shown in FIG. 3, the seat stays 80 connect to the chain stays 90 by inserting the rear wheel dropouts 40. The seat stays 80 and chain stays 90 can be formed and associated by known methods. Such a technique is conceivable to those skilled in the art and is not the point to be emphasized, therefore, the detailed description is omitted.

Figure 4:
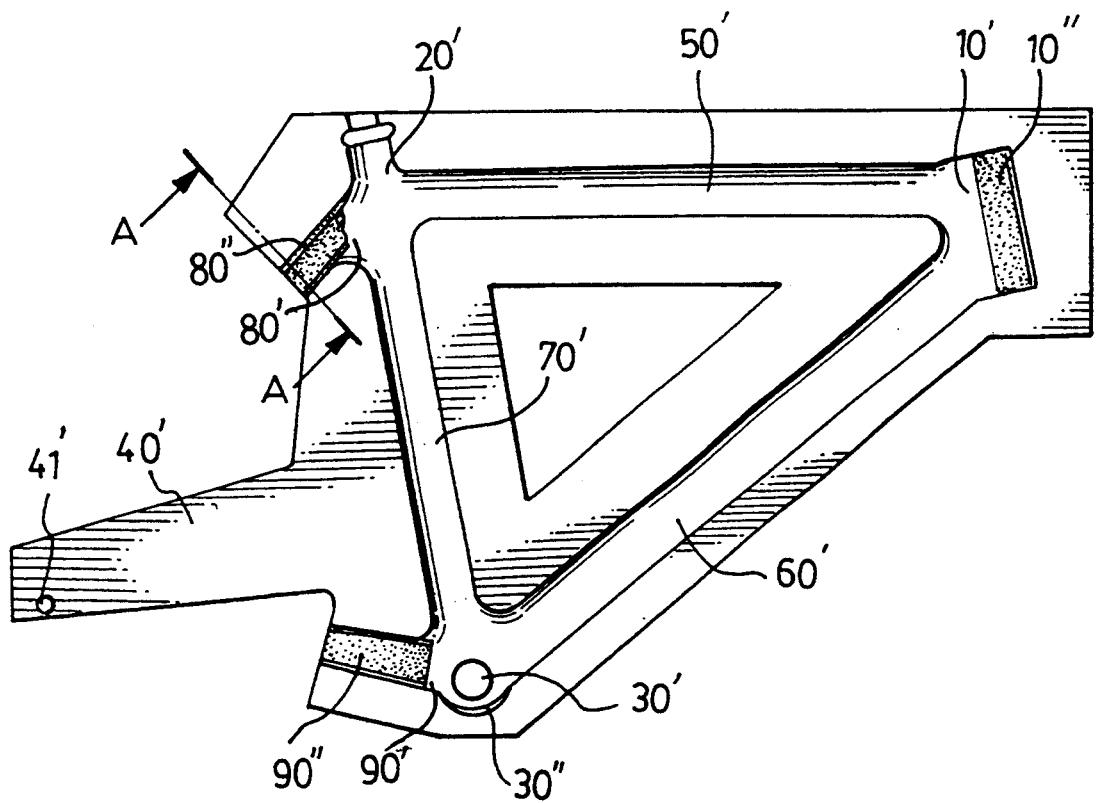
FIG. 4 is a plan view illustrating a front triangle mold in accordance with the present invention.

Referring now to FIG. 4, a front triangle mold in accordance with the present invention is shown. The front triangle mold comprises a steering support means cavity 10', a seat support means cavity 20', a pedal support means cavity 30', a top tube cavity 50', a down tube cavity 60', a seat tube cavity 70', a seat stay butting cavity 80', a chain stay butting cavity 90' and an extension 40' with a pin 41' provided thereon for keeping the dropout. Non-foaming dilatable materials 10", 30", 80" and 90" with greater expansion coefficient than that of the mold such as rubbers or plastics are respectively provided around the steering support means cavity 10', the pedal support means cavity 30', the seat stay butting cavity 80' and the chain stay butting cavity 90' to be formed as a part thereof.

Figure 5:
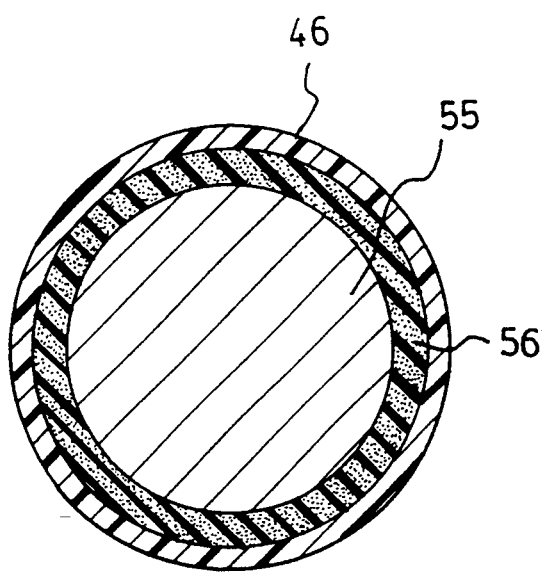
FIG. 5 is a schematic view illustrating the prepreg around a mandrel.

In FIG. 5, a schematic view illustrating the prepreg around a mandrel is shown. The number of plies and angle of prepreg is determined by structural analysis based on mechanics. As each part of the bicycle frame is different, and some fitting places are more complicated, such as the pedal support means. It is necessary to use a mandrel consisting of an aluminum bar 55 and a rubber sleeve 56. The prepreg is arranged around the mandrel to form prepreg layers 46.

Figure 8:
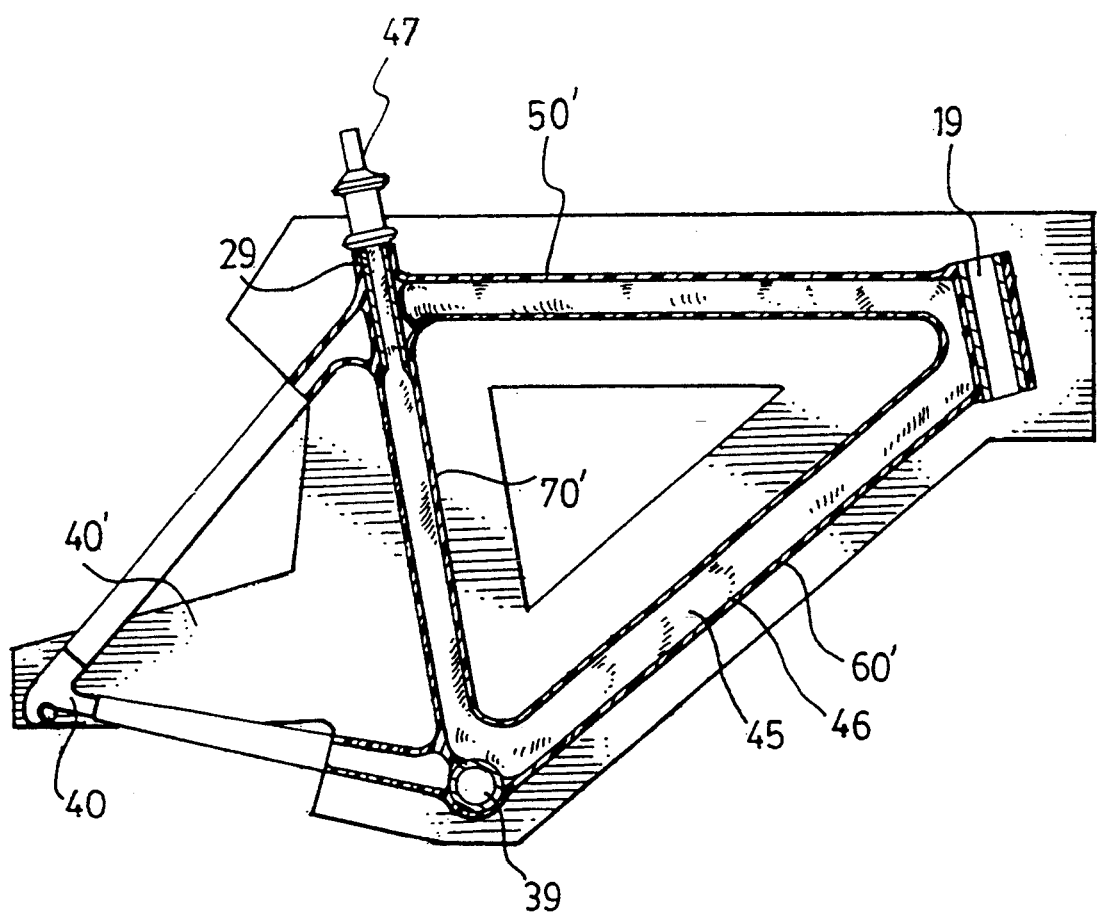
FIG. 8 is a plan view partially in section illustrating a bicycle frame being placed in a lower mold piece and a bladder being contained therein.

The prepreg is around the mandrel to get sufficient plies. The aluminum bar 55 is pulled out and prepreg layers 46 are still in contact with the rubber sleeve 56, and then the rubber sleeve 56 can be easily-pulled out because of its flexibility and hollow inside. Thus, the prepreg layers 46 form a hollow shape. With reference to FIG. 8, a bladder 45 is placed in the hollow prepreg layers 46, wherein the bladder 45 is connected to an air nozzle 47 for inflating. For molding the front triangle of the bicycle frame, the prepreg layers 46 of the front triangle are placed in the front triangle lower mold which can be assembled and secured with the corresponding female upper mold (not shown, for clarity), wherein sleeves 19, 29, and 39 are embedded within the steering support means 10, seat support means 20 and pedal support means 30, respectively.

Figure 6:
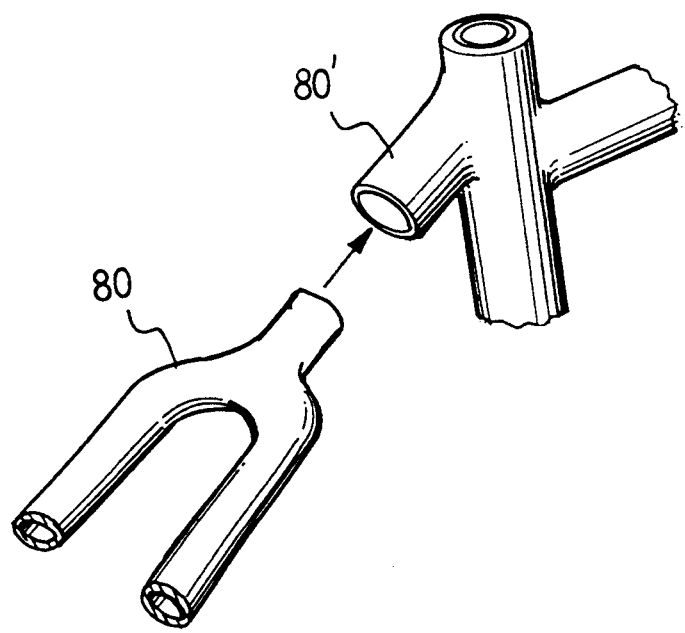
FIG. 6 is a schematic view illustrating the seat stays being capable of inserting into the front triangle of prepreg lay-up.
Figure 7:
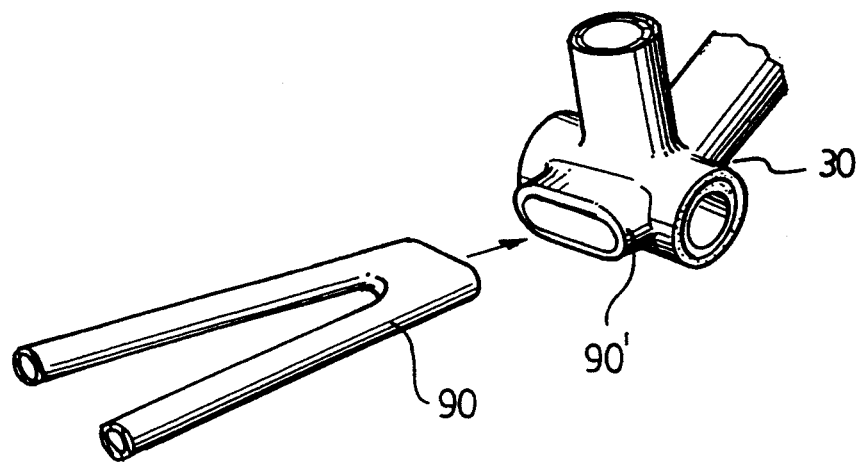
FIG. 7 is a schematic view illustrating the chain stays being capable of inserting into the front triangle of prepreg lay-up.

Furthermore, the corresponding end portion of the aforementioned cured seat stays 80 is inserted into the front triangle of uncured prepreg lay-up which is in the seat stay butting cavity 80', as shown in FIG. 6; and the corresponding end portion of the aforementioned cured chain stays 90 is inserted into the front triangle of uncured prepreg lay-up which is in the chain stay butting cavity 90', as shown in FIG. 7. An adhesive composition can be applied to the connections therebetween, if necessary. Hence, the whole bicycle frame in combination with the bladder 45 and sleeves 19, 29 and 39 is in the mold, as shown in FIG. 8.

The front triangle upper mold and the front triangle lower mold are assembled and secured, and then the front triangle is inflated, heated and cured. Non-foaming dilatable materials adjacent the steering support means cavity 10', the pedal support means cavity 30', the seat stay butting cavity 80' and the chain stay butting cavity 90' will expand. The non-foaming dilatable materials adjacent the seat stay butting cavity 80' and the chain stay butting cavity 90' provide not only the function of forming the desired shape of the corresponding portions from heating the non-foaming dilatable material to produce pressure and cure prepreg but also the function of easily connecting the seat stays 80 and chain stays 90 with the front triangle. The bladder may be removed or may be left within the interior of the frame because of its insignificant weight.

According to the preceding description, the present invention adopts respective molds for forming the front triangle and rear triangles which are smaller than those of the above-mentioned U. S. Patents. Hence, with the method of molding composite bicycle frames according to the present invention it becomes easy to control the molding accuracy and the manufacture of the bicycle frame is at low cost. Because of the smaller molds, the heat transferred from the molding unit to the frame takes place quickly such that the molding process is shortened and the frame has a shorter molding cycle for easy mass production. Besides, a better effect in quality control of microstructure can be achieved and the smaller molds prevent the prepreg from pinching.

Moreover, this invention uses non-foaming dilatable materials to substitute for the foamable resins to prevent flowing out of the clearances between the prepreg layers and sleeves embedded in the frame, and the frame is relatively light and stress concentrations can be avoided because the frame has no foamable resins or other adverse objects.

Of course it is understood that the above is merely a preferred embodiment of the invention and that various changes and alterations, such as separating the front triangle mold, disposing the prepreg or bladder in a different way and placing the non-foaming dilatable materials in a different position, can be made without departing from the spirit and broader aspects thereof as set forth in the appended claims.

What is claimed is:

1. A method of molding a composite bicycle frame, said bicycle frame comprising tube portions for connecting at least two of a steering support, a seat support and a pedal support; said method comprising the steps of:
   (a) curing a pair of seat stays and chain stays;
   (b) placing a front triangle of prepreg layers with a bladder in a front triangle mold, said front triangle mold being provided with a seat stay butting cavity and a chain stay butting cavity, said front triangle mold being provided with non-foaming dilatable materials with greater expansion coefficient than that of a remainder of the mold, said non-foaming dilatable materials being arranged adjacent each of said cavities and exterior of said prepreg layers;
   (c) inserting the cured seat stays and chain stays into said front triangle of prepreg layers at the seat stay butting cavity and chain stay butting cavity, respectively; and
   (d) inflating the bladder and heating the front triangle mold to cure the front triangle.

2. A method as claimed in claim 1, wherein the step of heating the front triangle mold causes the non-foaming dilatable materials to expand because of their greater expansion coefficient than that of the remainder of the mold.

3. A method as claimed in claim 1, wherein said non-foaming dilatable materials are rubbers.

4. A method as claimed in claim 1, wherein said non-foaming dilatable materials are plastics.

5. A method as claimed in claim 1, wherein one of said non-foaming dilatable materials is adjacent a steering support means cavity in the mold.

6. A method as claimed in claim 1, wherein one of said non-foaming dilatable materials is adjacent a pedal support means cavity in the mold.

7. A method of molding a composite bicycle frame comprising the steps of placing prepreg layers in a bicycle frame mold; heating and curing the prepreg layers; and providing within cavities of the bicycle frame mold and exterior of said prepreg layers non-foaming dilatable materials having a greater expansion coefficient than that of a remainder of the mold, the step of heating and curing causing the non-foaming dilatable materials to exert pressure and the prepreg layers to cure.

8. A method as claimed in claim 7, wherein said non-foaming dilatable materials are rubbers.

9. A method as claimed in claim 7, wherein said non-foaming dilatable materials are plastics.

10. A method as claimed in claim 7, wherein one of said non-foaming dilatable materials is adjacent a steering support means cavity in the mold.

11. A method as claimed in claim 7, wherein one of said non-foaming dilatable materials is adjacent a pedal support means cavity in the mold.

12. A method as claimed in claim 7, wherein said mold is provided with a seat stay butting cavity and a chain stay butting cavity, and said cavities are provided with non-foaming dilatable materials.

13. A method as claimed in claim 7, wherein said non-foaming dilatable materials are adjacent a steering support means cavity and a pedal support means cavity in the mold.

14. A method as claimed in claim 13, wherein said mold is provided with a seat stay butting cavity and a chain stay butting cavity, and said cavities are provided with non-foaming dilatable materials.

15. A method as in claim 1, further comprising the step of connecting the seat stays and the chain stays with the front triangle, the step of connecting including inserting end portions of the seat and chain stays into end portions of cavities of the front triangle before the step of curing the prepreg layers.

16. A method as in claim 7, further comprising the step of connecting seat stays and chain stays with a front triangle via the non-foaming dilatable materials.

* * * * *